United States Patent [19]
Hsu

[11] Patent Number: 5,234,180
[45] Date of Patent: Aug. 10, 1993

[54] BI-DIRECTIONAL REWINDING APPARATUS FOR 8 MM VIDEO TAPE

[75] Inventor: Lung-Chuan Hsu, Taipei, Taiwan

[73] Assignee: Rayton Enterprises Corp., Taipei, Taiwan

[21] Appl. No.: 889,279

[22] Filed: May 28, 1992

[51] Int. Cl.⁵ .................. G11B 15/00; B65H 23/00
[52] U.S. Cl. .................................... 242/200; 242/179
[58] Field of Search ............. 242/179, 198, 199, 200, 242/201; 360/85, 95

[56] References Cited

U.S. PATENT DOCUMENTS

| | | | |
|---|---|---|---|
| 4,749,147 | 6/1988 | Chen | 242/201 |
| 4,750,062 | 6/1988 | Suzuki | 360/85 |
| 4,752,844 | 6/1988 | Suzuki | 360/85 |

Primary Examiner—Daniel P. Stodola
Assistant Examiner—John Q. Nguyen
Attorney, Agent, or Firm—Pollock, Vande Sande & Priddy

[57] ABSTRACT

An automatic bi-directional tape rewinding apparatus applicable to 8 mm video tape. The apparatus has very few mechanical elements, which include a device capable of automatically moving rollers to the entrance and the exit of tape, protecting tape from rubbing with tape cassette case, a device automatically stopping tape rewinding apparatus and opening the cassette holder as tape runs to its ends; and a device able to be operated manually to stop the apparatus and automatically open the tape cassette holder.

3 Claims, 7 Drawing Sheets

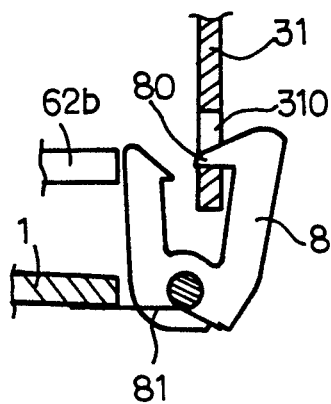
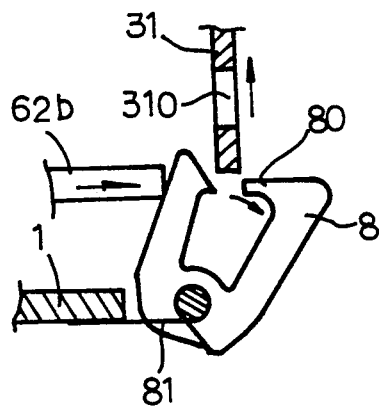
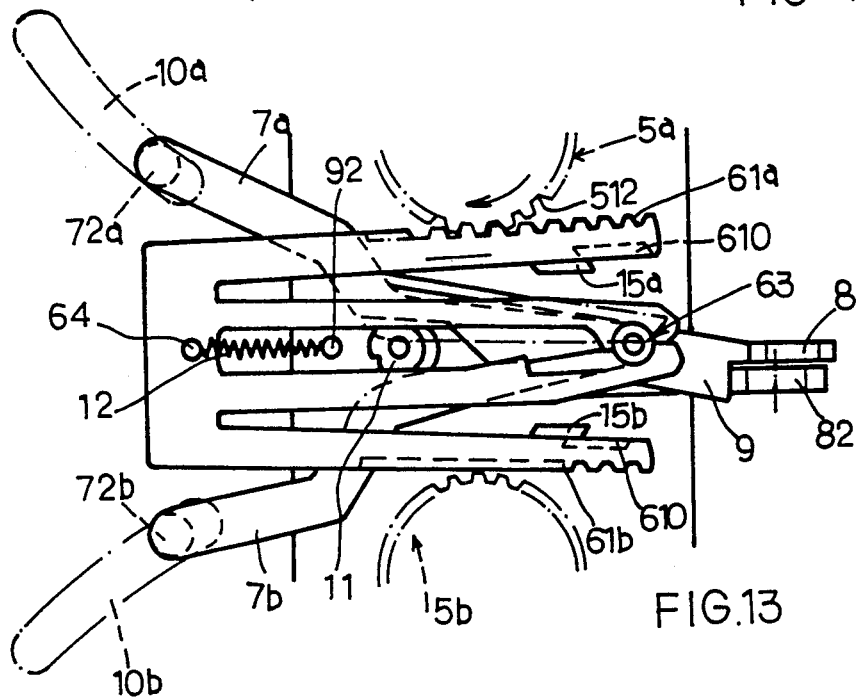
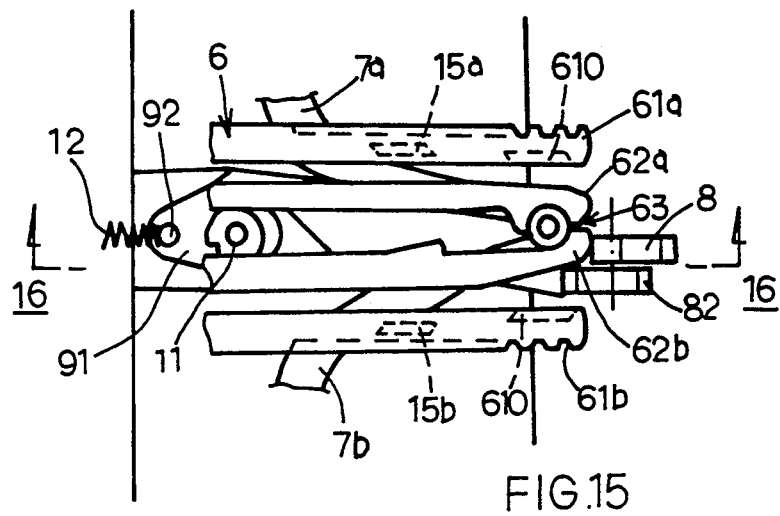

BI-DIRECTIONAL REWINDING APPARATUS FOR 8 MM VIDEO TAPE

FIELD OF THE INVENTION

The present invention relates to a video tape rewinding device, especially to a bi-directional tape rewinding device for 8 mm video tape.

BACKGROUND OF THE INVENTION 8 mm video tape cassettes have been successfully developed in the past few years. Before the success, conventional large tape cassettes like VHS, BETA, VHS-C, etc., have been developed for a long time, and the tape rewinding technique for large tape is rather satisfactory, no matter whether it is a single tape rewinding machine or a combination of video cassette recorder and tape rewinding apparatus. However, because 8 mm miniature video tape cassettes do not have rollers to avoid rubbing between tape and cassette case while tape transfer, the tape rewinding mechanism design must be more elaborated to eliminate such rubbing. Consequently, it needs more technique than the conventional large video tape, particularly for a tape rewinding apparatus with a bi-directional automatic rewinding feature. Up to the present, some video cassette recorders that have bi-directional rewinding devices for 8 mm video tape are rather complicated and most of them employ two motors as power sources.

In addition, some manufacturers make 8 mm tape rewinding machines by separating the rewinding apparatus from video cassette recorders and controlling the operation sequence of two motors by complex integrated circuits to acquire the effect of automatic bi-directional tape rewinding. Besides, a design that employs complicated mechanical gear transmission control system to substitute for the foregoing sequence control of integrated circuits has not succeeded due to its high complexity.

8 mm video tape has gradually become popular. There is an increasing demand for a separate automatic bi-directional tape rewinding apparatus.

SUMMARY OF THE INVENTION

Therefore, it is a principal object of the present invention to provide an automatic bi-directional tape rewinding means applicable to 8 mm video tape. The apparatus according to the embodiment of this invention is characterized in that: least mechanical parts, employing a single motor, and no need of sequence control of integrated circuits, wherein, a device that automatically moves rollers to the entrance and the exit of tape to protect tape from rubbing with cassette case, a device capable of automatically stopping the tape rewinding apparatus and uncovering the tape cassette holder, and a device able to be manually operated to stop the apparatus and automatically open tape cassette holders are included.

BRIEF DESCRIPTION OF THE DRAWINGS

FIG. 13 shows the initial state of the driving mechanism shown in FIG. 11;

FIG. 15 is a plan view similar to FIG. 14, but shows the movement of the driving mechanism during the release of tape cassette holder;

FIG. 16 is a cross-sectional view of the mechanism shown in FIG. 15 taken along the line 16—16;

FIG. 17 is similar to FIG. 16, but shows the lock has been released;

DETAILED DESCRIPTION OF THE PREFERRED EMBODIMENTS

The invention includes three distinctive mechanisms. These mechanisms may be individually or commonly applied to 8 mm video tape rewinding apparatuses to acquire special effects. Although the appearance of the tape rewinding apparatus incorporating the three mechanisms does not have much difference from a conventional tape rewinding machine, its internal construction is all-new designed. Therefore, the behavior it acts is totally different.

This invention comprises one tape-guide device which pulls out a length of magnetic tape lying outside the tape cassette and moves the length of magnetic tape to the operating position, an automatic stopping device which can automatically stop the tape rewinding apparatus when magnetic tape runs to its ends and uncover the tape cassette holder, and a manual stopping device which can be manually operated to stop tape rewinding and uncover the tape cassette holder at any time while tape rewinding.

The invention is described below in more detail with reference to the drawings.

Figure 1:
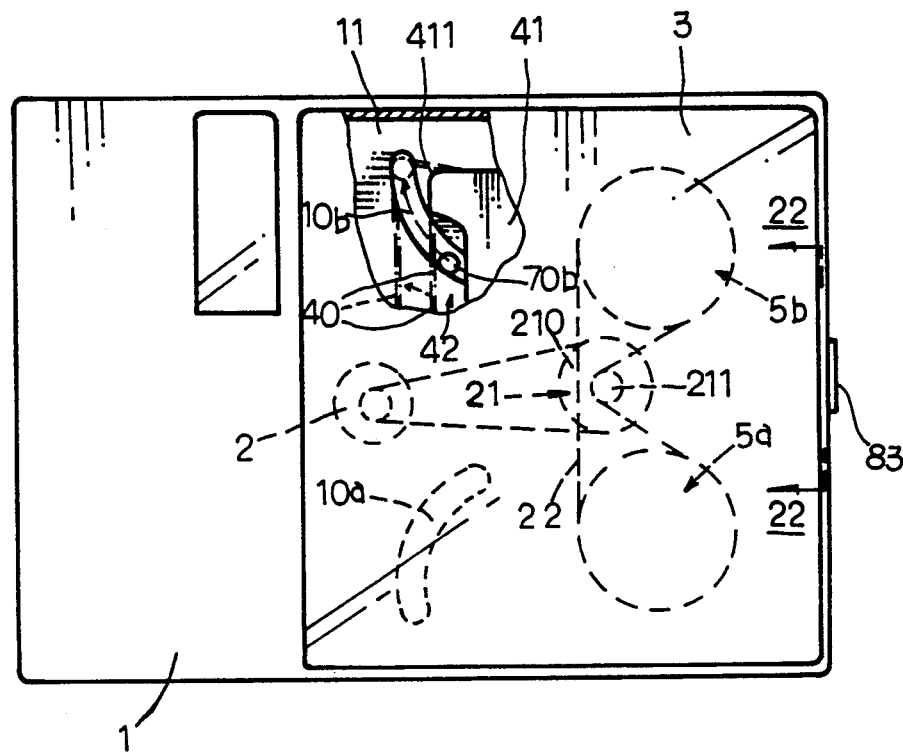
FIG. 1 is a top view showing a preferred embodiment of a video tape rewinding apparatus according to the present invention, which employs roller mechanism and one motor to attain automatic bi-directional tape rewinding effect according to the present invention.
Figure 2:
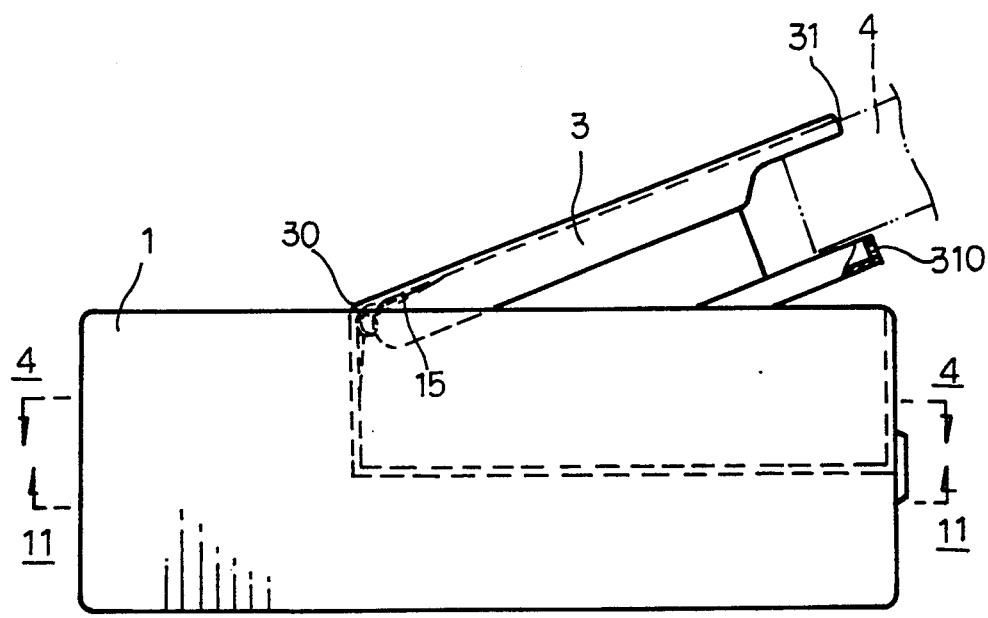
FIG. 2 is a side view of the apparatus shown in FIG. 1, in a state where the tape cassette holder is lifted up.
Figure 3:
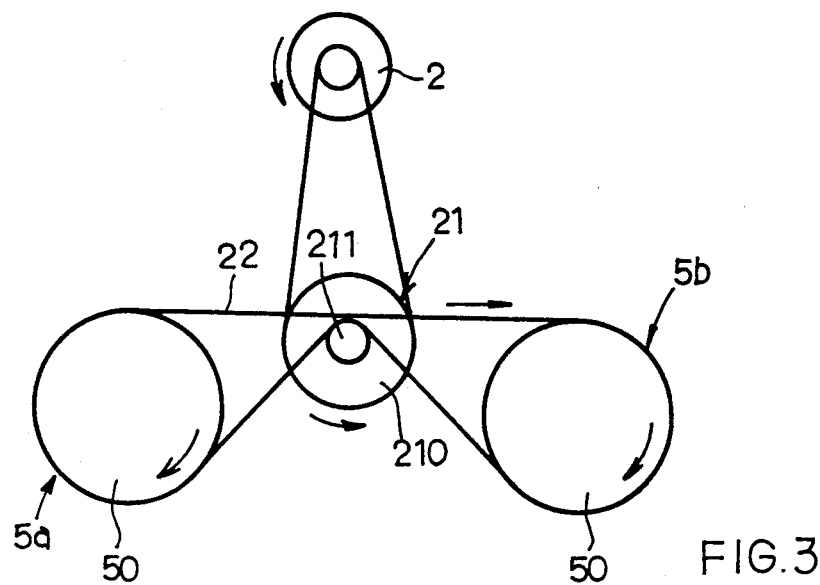
FIG. 3 is a schematic drawing showing the transmission mechanism of the preferred embodiment.

FIGS. 1 and 2 schematically show an embodiment of an 8 mm video tape bi-directional tape rewinding apparatus, which comprises a base 1, including a housing accommodating the whole mechanism and all the portion that does not move during operation; a pair of arced slots 10a and 10b which are each arranged on the sides of the partition floor of the base, a motor installed inside the base to act as the power source, a video tape cassette holder 3 which is pivotally supported by a pin at its first end 30 and provided at the upper portion of the base (as shown in FIG. 2); its second end 31 is open-ended and has an opening at its lower portion; the second end lifts above the base as the cassette holder 3 swivels upward around the first end 30 to facilitate taking out or inserting the tape cassette 4, two reel assemblies 5a and 5b installed inside the base that can be inserted into the hubs of a tape cassette to drive tape, an idle wheel 21 installed inside the base as shown in FIGS. 1 and 3, coaxially consisting of a driven wheel 210 and a driving wheel 211 wherein the driven wheel 210 is driven by the motor 2 and the driving wheel 211 and the belt wheel 50 of the foregoing reel assemblies 5a and 5b are simultaneously connected by the belt 22 and so that the two reel assemblies can rotate with the same speed but in reverse direction.

As shown in FIG. 1, the space between the tape 40 lying outside the video tape cassette 41 inserted into the tape cassette holder 3 and the tape cassette 41 crosses over the arced slots 10a and 10b.

The above-mentioned apparatus is characterized in a device capable of extracting a length of tape 40 while tape rewinding, which includes:

a stopper 11 (shown in FIG. 11) mounted on the foregoing base and located on the central line c between the reel assemblies 5a and 5b.

a sliding plate 6 moving along the central line c and having a base portion 60 wherein four strap plates extends from the base portion in a direction generally parallel to the central line, two outer strap plates have racks 61a and 61b formed on their outer sides; the inner two form a pair of strap clamps 62a and 62b holding the stopper 11; the paired strap clamps 62a and 62b meet each other at their ends forming a pivotal portion 63, a pair of connecting members 7a and 7b which each have the first ends 70a and 70b and the second ends 71a and 71b wherein the first end of each connecting member is pivotally equipped with a roller, 72a and 72b respectively, which each roller moves along the arced slots 10a and 10b respectively, and the second ends 71a and 71b are connected with each other and pivoted on the aforesaid pivotal portion 63, and a bossed portion 621 on the inner side of either of the paired clamps 62a or 62b (62a in this embodiment and drawings) that can be blocked by the stopper 11 to position the sliding plate 6 as the sliding plate 6 moves to its operating position.

Figure 5:
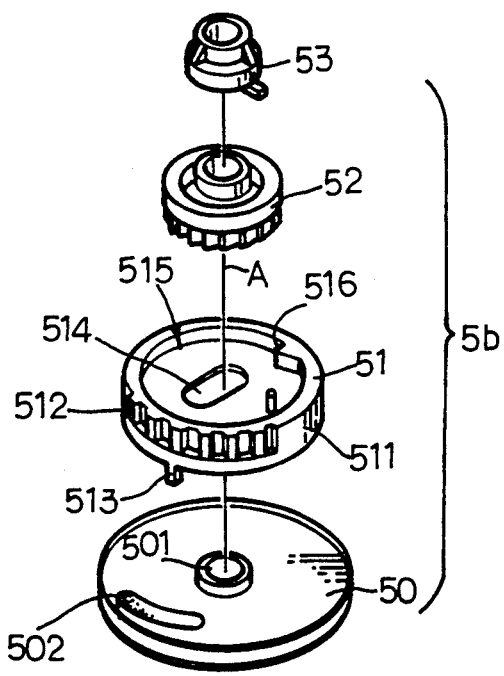
FIG. 5 is a perspective exploded view of the reel assembly of the embodiment of this invention.
Figure 6:
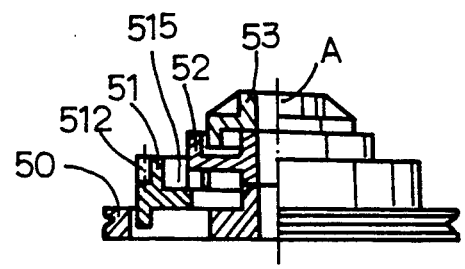
FIGS. 6 and 7 are respectively a cross-sectional view and a plan view of the reel assembly shown in FIG. 5.
Figure 4:
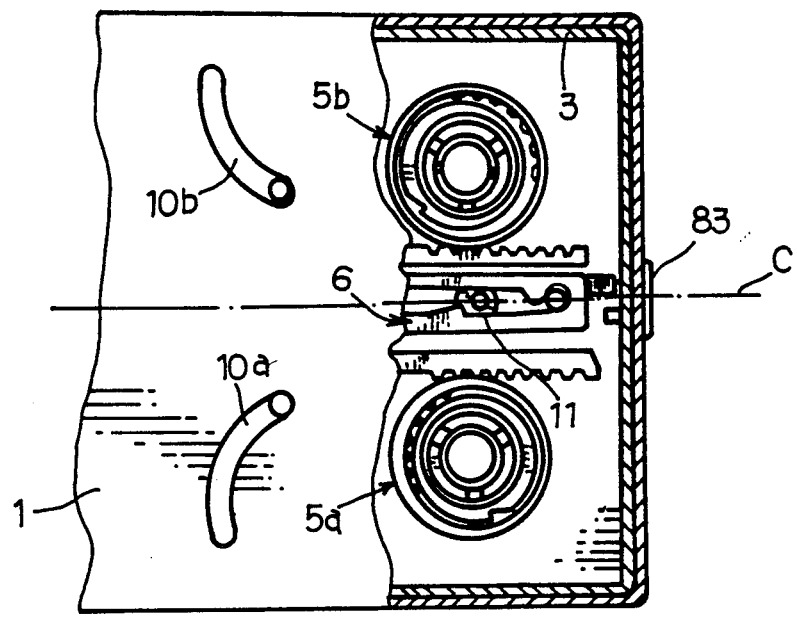
FIG. 4 is a cross-sectional view of the apparatus shown in FIG. 1 taken along the line 4—4.
Figure 8:
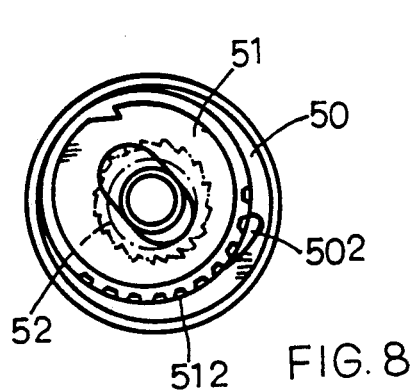
FIG. 8 is a plan view similar to FIG. 7 except that two parts are omitted.
Figure 7:
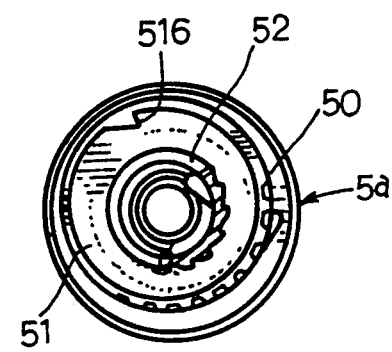
Figure 10:
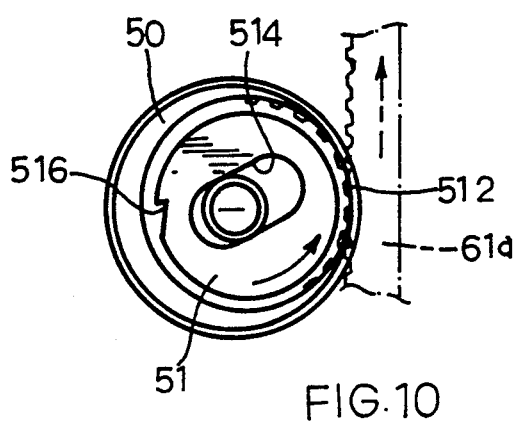
FIG. 10 shows another movement of the reel assembly of FIG. 9.
Figure 9:
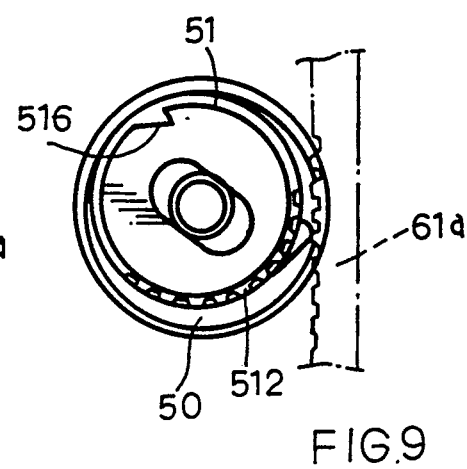
FIG. 9 is another view of the mechanism of FIG. 8, showing the reel assemblies in contact with a rack.

The aforementioned reel assemblies 5a and 5b, as shown in FIG. 1 and FIGS. 5 to 10, each have four elements, wherein FIG. 5 shows the four elements of the reel assembly 5b and FIGS. 7 to 10 depict the elements of the reel assembly 5a. The elements of each reel assembly are alike except that the directions of the teeth of the ratchet wheel and the slot of the belt wheels are opposite.

To cite one example of FIG. 5, the belt wheel 50 of the reel assembly 5b has a slot 502 extending outward from the axis center 501. A movable eccentric wheel 51 with a few teeth 512 on a portion of its outer rim and a pole 513 on the bottom that can be inserted into the slot 502 of the belt wheel 50 is coaxially mounted on the belt wheel 50. The belt wheel 50 has an annular construction 515 around its upper portion to form a concave surface which annular construction 515 has a ratchet tooth 516 on the inner periphery. A ratchet wheel 52 is mounted on the eccentric wheel 51 and surrounded by the annular construction 515. A reel wheel 53 is mounted on the ratchet wheel 52 and may be inserted into the hubs of the tape cassette to drive tape. When reel assemblies rotate in a certain direction (clockwise in FIG. 5), the eccentric wheel 51 will move outward until its teeth 512 on the outer rim engage with either the rack of the sliding plate 6, for instance 61a, and drive the latter. Then the rollers 72a and 72b located at the ends of two connecting members 7a and 7b move along the arced slots 10a and 10b respectively. The motion of each roller 72a and 72b is both in horizontal and in vertical directions. Hence, the rollers rise into the space 42 between tape 40 and the cassette 41 and pull out tape 40 to the position indicated by the phantom line of FIG. 1. Naturally, tape will not rub with the corner 410 of the tape cassette 41 any more.

This invention is also characterized in a device that can automatically stop tape rewinding and uncover the tape cassette holder, which includes: a foregoing stopper 11, a foregoing sliding plate 6, and a pair of foregoing connecting members 7a and 7b.

As can be seen in FIGS. 15, 16 and 17, another U-shaped clamp 8 is pivoted on the aforesaid base 1 and is constantly kept at the normal position by the force of an energy storage element 81 (a torsion spring in FIG. 16). As the cassette holder 3 is pushed into the aforesaid base 1, the hook 80 of the U-shaped clamp 8 will withhold the opening 310 of the tape cassette holder. It can be seen in FIGS. 11 and 12 that an energy storage device 12 (an extension spring in the figures) is fixed by the push stub 92 (will be detailed later) at one of its ends and by the barbed stub 64 of the sliding plate 6 at the other end.

Figure 21:
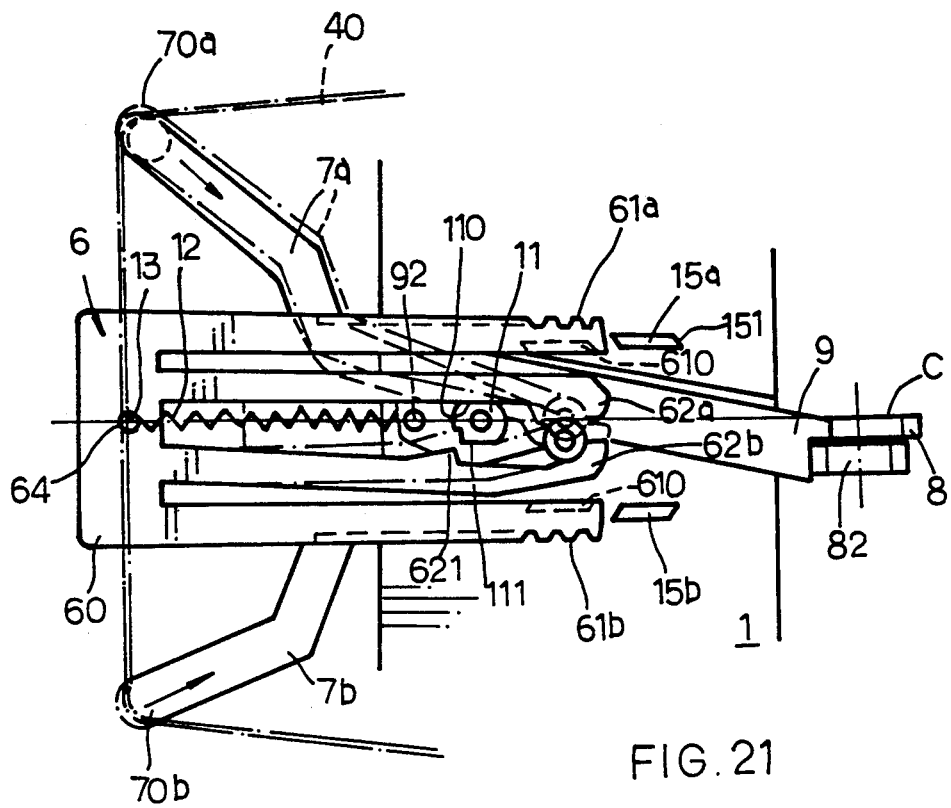
FIG. 21 is similar to FIG. 11, but shows the mechanism movement in automatic stop mode.
Figure 22:
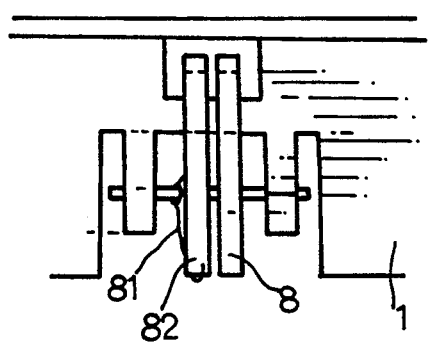
FIG. 22 is a cross-sectional view taken along the line 22—22 in FIG. 1.
Figure 23:
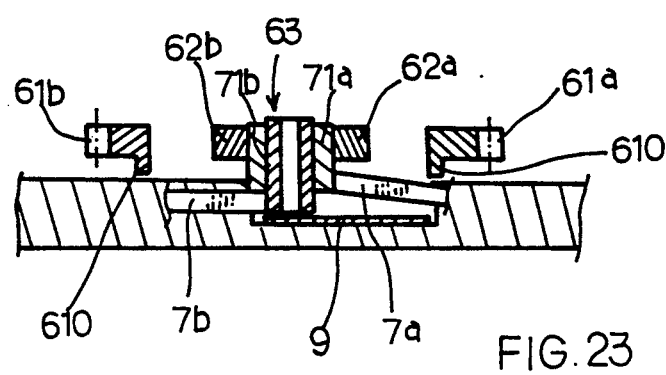
FIG. 23 is a cross-sectional view taken along the line 23—23 in FIG. 11.

As tape rewinding is completed as shown in FIG. 21, the tape tension will push the rollers 72a and 72b as well as the connecting members 7a and 7b backward. Consequently, the pivotal portion 63 consisting of two strap clamps of the sliding plate 6 is separated to release the bossed portion 621 from the stopper 11, then the sliding plate 6 is forced to move (to the right) by the energy storage device 12. The backward motion of the sliding plate 6 produces the rotation of the U-shaped clamp 8; and the hook 80 of U-shaped clamp 8 leaves the opening 310 of the cassette holder to release the tape cassette holder.

The tape cassette holder 3 has to bear constantly the force of the energy storage element 15 (torsion spring in FIG. 2) located on the position where the tape cassette holder is pivoted on the base 1. As the U-shaped clamp 8 releases the opening 310 of the tape cassette holder as shown in FIG. 2, the tape cassette holder will automatically restore to its normal uplift position so that the open end 31 of the cassette holder emerges from the base 1.

To make the sliding plate 6 move smoothly, the stopper 11 is constantly in contact with the inner sides of two strap clamps 62a and 62b extending from the sliding plate 6. The contact portions of two strap clamps are flat surfaces.

It is still characterized in a device that can be manually operated to stop tape rewinding and uncover the cassette holder, which includes: a foregoing stopper 11, a foregoing sliding plate 6 and a pair of foregoing connecting members 7a and 7b. As indicated in FIGS. 11, 18, 19, 20 and 22, a V-shaped lever 82 having one end of exerting force and the other end of receiving force and the foregoing U-shaped clamp 8 are coaxially pivoted on the base 1. A push rod 83 that can move freely is mounted on the base 1 and abuts against the end of receiving force of the V-shaped lever 82.

A movable plate 9 is pivoted on the stopper 11, which has one end 90 of receiving force and a movable end 91. The end 90 of receiving force abuts against the end 821 of exerting force of the foregoing V-shaped lever 82; however, the push stub 92 on the movable end 91 is enveloped by the middle sections of the paired strap clamps 62a and 62b of the sliding plate 6.

As the push rod 83 moves, the V-shaped lever 82 closely adjacent to the push rod 83 will swivel along with the motion. As a result, the end 821 of exerting force of the V-shaped lever 82 moves the end 90 of receiving force of the movable plate 9; the movable end 91 of the movable plate 9 also begins to move. This results in a movement of the push stub 92 as indicated by the phantom line in FIG. 20. Such a movement pulls the paired strap clamps of the sliding plate 6 apart so that the bossed portion 621 of the strap clamp is separated from the stopper 11, then the sliding plate 6 may be moved by the force of the energy storage device 12.

The movement of the sliding plate 6 will push the U-shaped clamp to release the opening 310 of the tape cassette holder 3. Hence, the tape cassette holder turns upward.

The reason that the two reel assemblies rotate in opposite direction is to make the rewinding for two sides of video tape cassettes possible. The different direction in long slots on belt wheels and the teeth of ratchet wheel is to shift the eccentric wheel 51 and move the sliding plate 6 at rewinding beginning no matter which one of two reel assemblies drives tape.

There are many ways of turning off the motor, for instance, installing a limit switch on the bottom of the tape cassette holder; the power will be turned off as the tape cassette holder leaves its compartment in the base, and so on. These are well-known to most manufacturers and not discussed here.

Figure 11:
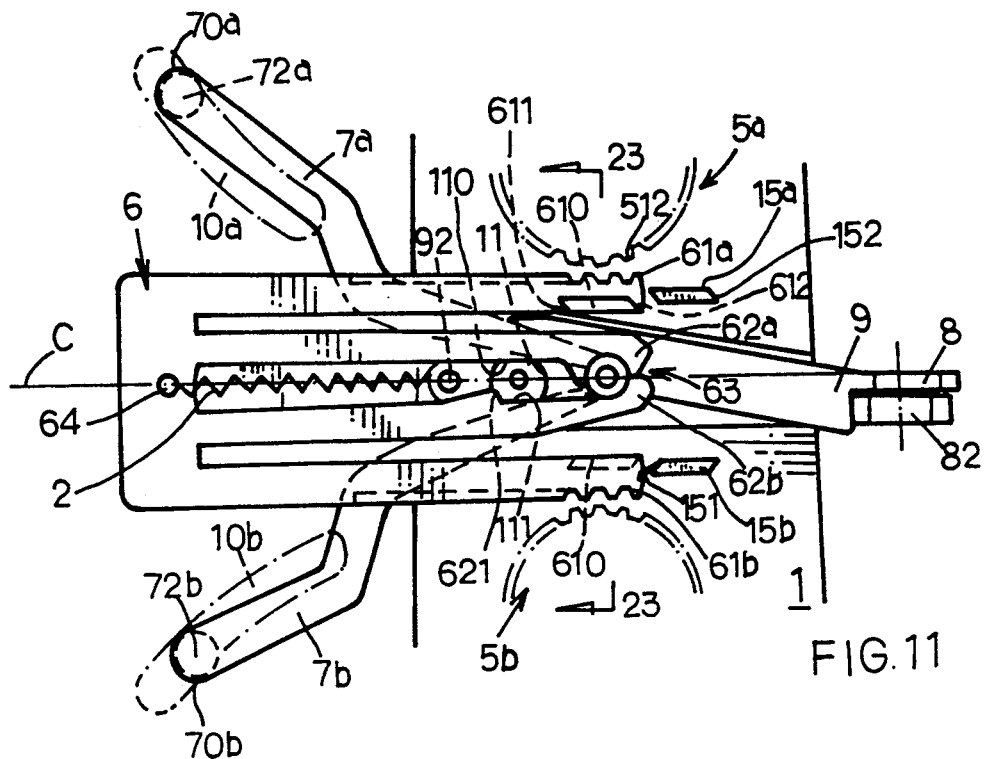
FIG. 11 is a partial sectional view of the tape rewinding apparatus shown in FIG. 2 taken along the line 11—11.
Figure 14:
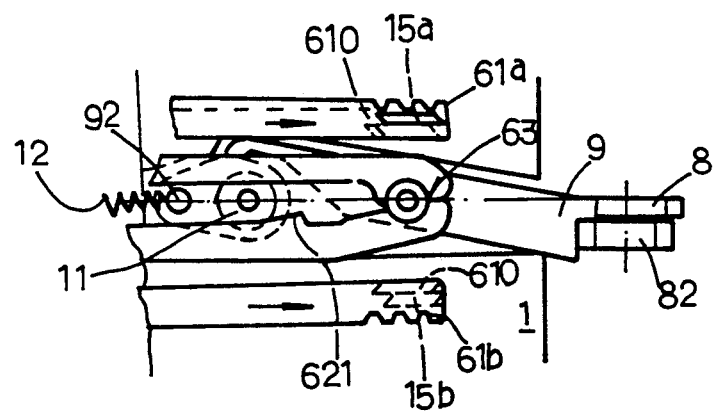
FIG. 14 is similar to FIG. 13, but shows the movement of the mechanism of FIG. 11 during rewinding.
Figure 12:
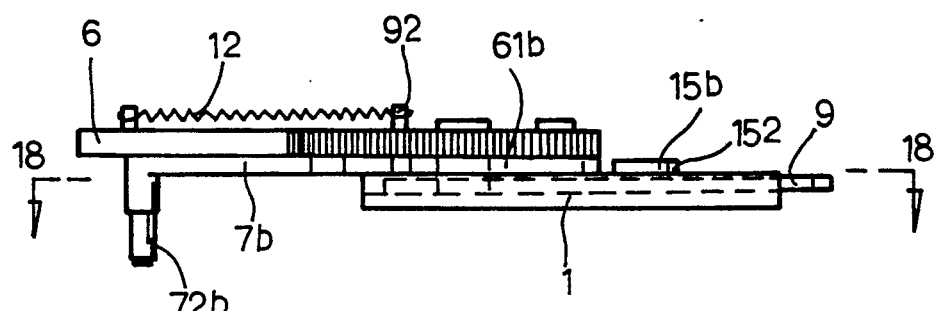
FIG. 12 is a side view of the mechanism shown in FIG. 11.
Figure 18:
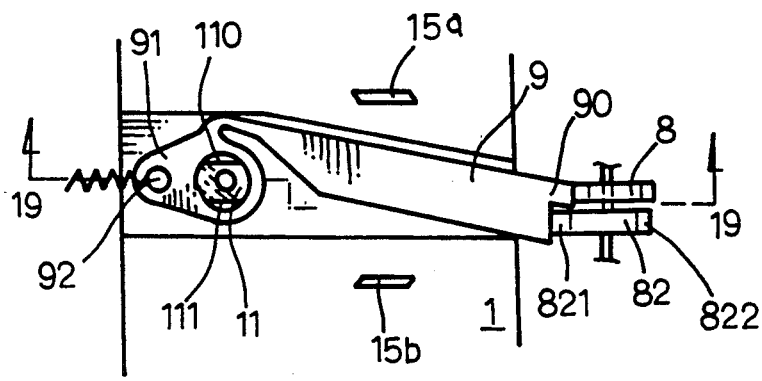
FIG. 18 is a side view taken along the line 18—18 in FIG. 12, showing the manual stop mechanism.
Figure 19:
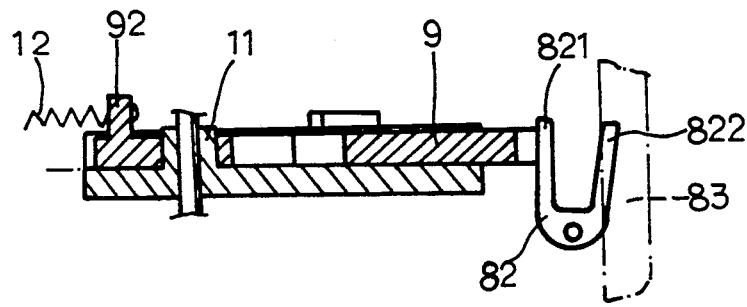
FIG. 19 is a cross-sectional view taken along the line 19—19 in FIG. 18.
Figure 20:
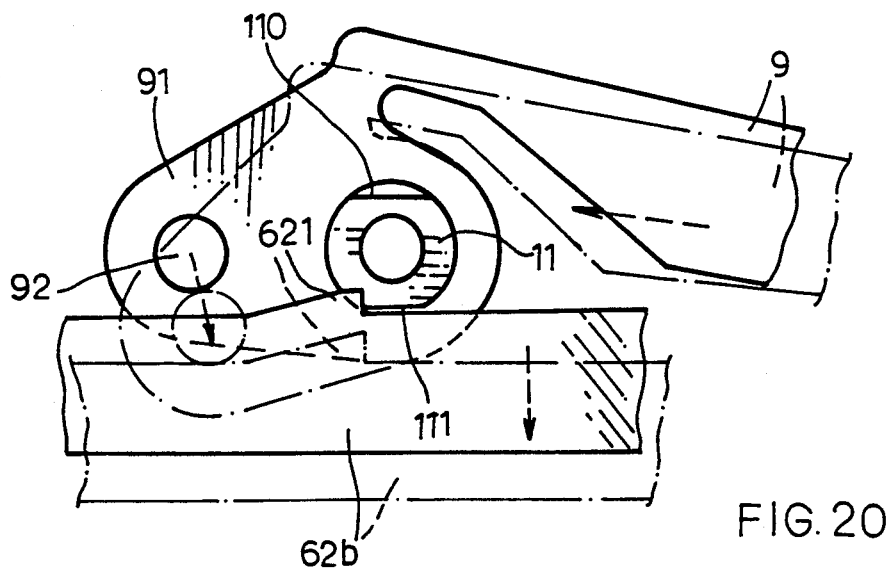
FIG. 20 is a partial enlargement view of the mechanism of FIG. 18, indicating the mechanism movement of manual release of tape cassette holders by phantom lines.

If the above-mentioned devices of stopping tape rewinding and uncovering the tape cassette holder 3, either of automatically operated or of manually operated, are combined with the device of extracting tape and applied to a tape rewinding machine, it is necessary to install a pair of rails 15a and 15b with tapers 151 and 152 on the ends of each rail in the sliding area of sliding plate 6 as shown in FIG. 11. Meanwhile, a long protrusion 610 with tapers 611 and 612 at its ends is to be made on the bottom of the racks 61a and 61b of the sliding plate 6 to avoid the temporary rotation of reel assemblies due to inertia after the motor is being turned off, or the rotation of reel assemblies would hinder the transfer of the sliding plate 6. As the sliding plate 6 returns to its initial position as shown in FIG. 14, the long protrusion 610 on the racks 61a and 61b moves along the rails 15a and 15b and does not engage with the teeth 512 of the eccentric wheel 51 of the reel assemblies.

Obviously the present invention is not limited to the above-described embodiments. Some variations in construction and arrangement are not to be regarded as a departure from the spirit and scope of the invention, and all such modification as would be obvious to one skilled in the art intended to be included within the scope of the following claims.

What is claimed is:

1. A bi-directional tape rewinding apparatus for 8 mm video tape, comprising:

a base;

a pair of arced slots arranged on said base;

a motor mounted on said base;

a tape cassette holder, a first end thereof being pivoted to said base and a second end thereof being an open end, wherein when said tape cassette holder rotates by the axis of the first end to rise, the second end emerges from said base to facilitate taking out and inserting tape cassettes;

two reel assemblies each including a belt wheel pivoted to said base; and an idle wheel coaxially having a driven wheel and a driving wheel and being pivoted to said base, wherein said driven wheel is driven by said motor and said driving wheel is simultaneously connected with said belt wheels of said two reel assemblies so that said reel assemblies can rotate at the same peripheral speed but in the reverse direction, wherein the space between a length of tape lying outside the tape cassette inserted into said cassette holder and during rewinding operation crosses over a portion of said arced slots;

said apparatus having a device capable of extracting tape for rewinding, said device comprising:

a stopper mounted on said base and located on a central line between said reel assemblies;

a sliding plate moving along the central line of said reel assemblies and having a base portion, from which four strap plates extend in generally parallel direction, in which two outer strap plates have racks formed on their outer sides, the other two strap plates form a pair of strap clamps holding said stopper wherein the ends of said paired strap clamps meet each other at a location where they form a pivotal portion; and a pair of connecting members each having a first end and a second end, said first end of each member being equipped with a tape extracting roller so that said connecting members can move along said arced slots on said base, and extract tape said second end of each member being pivotally connected with each other and pivotally mounted on the pivotal portion of said strap clamps, one of said paired strap clamps has a bossed portion on its inner side in order that the bossed portion will be stopped by said stopper to position said sliding plate when said sliding plate moves to its operating position;

the belt wheel of each said reel assembly has a long slot extending outwardly from its center axis; and said two reel assemblies each having a movable eccentric wheel mounted on said belt wheel, each eccentric wheel being equipped with gear teeth on a portion of its outer rim and a stub on its bottom which can be inserted into the long slot of said belt wheel, and when each reel assembly rotates in a certain direction, said eccentric wheel moves outwardly until the teeth on its outer rim engage with the rack of one strap plate of said sliding plate, then said sliding plate is driven to its operating position, the motion of said rollers at the ends of said connecting members being along said arced slots.

2. A tape rewinding apparatus as claimed in claim 1, wherein along the axial line, said two reel assemblies each comprise:

said belt wheel;

said eccentric wheel mounted on said belt wheel, of which an axial hole is a slotted hole, and its upper portion is an annular construction with a ratchet tooth on the inner side;

a ratchet gear mounted on said eccentric wheel and located inside the annular construction; and a reel wheel mounted on said ratchet wheel.

3. A tape rewinding apparatus as claimed in claim 1, wherein said stopper is constantly kept in contact with the inner sides of said two inner strap clamps of said sliding plate, the contact portions of said two strap clamps being flat surfaces.

* * * * *